US010699044B2

(12) United States Patent
Qian et al.

(10) Patent No.: US 10,699,044 B2
(45) Date of Patent: Jun. 30, 2020

(54) INTEGRATED CIRCUIT DESIGN MODEL SPLITTING FOR FORMAL VERIFICATION

(71) Applicant: INTERNATIONAL BUSINESS MACHINES CORPORATION, Armonk, NY (US)

(72) Inventors: Chen Qian, Shanghai (CN); Heng Liu, Shanghai (CN); Peng Fei Gou, Shanghai (CN); Yang Fan Liu, Shanghai (CN); Yan Heng Lu, Shanghai (CN); Zhen Peng Zuo, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 16/035,212

(22) Filed: Jul. 13, 2018

(65) Prior Publication Data
US 2020/0019652 A1  Jan. 16, 2020

(51) Int. Cl.
G06F 17/50 (2006.01)
G06F 30/33 (2020.01)
(Continued)

(52) U.S. Cl.
CPC ............ G06F 30/33 (2020.01); G06F 30/27 (2020.01); G06F 30/327 (2020.01);
(Continued)

(58) Field of Classification Search
None
See application file for complete search history.

(56) References Cited

U.S. PATENT DOCUMENTS 7,448,008 B2  11/2008 Seigler et al.
8,417,507 B2   4/2013 Arbel et al.
(Continued)

OTHER PUBLICATIONS

Toni Mancini, et al., System level formal verification via model checking driven simulation, 2013, http://paeon.di.uniroma1.it/documents/publications/23_Mancini_etal2013.pdf, last visited Jul. 9, 2018, 16 pages.

(Continued)

Primary Examiner — Leigh M Garbowski
(74) Attorney, Agent, or Firm — Kunzler Bean & Adamson; Bruce R. Needham

(57) ABSTRACT

An apparatus for model splitting includes an extraction module that extracts netlist parameters from a static netlist. The netlist parameters include node parameters of each node of the static netlist. The node parameters include node connection information and execution cycle information. The nodes of the static netlist include nodes of an integrated circuit design from an input to an output. A split node module analyzes, using the netlist parameters, each node in a cycle and determines if each node is a potential split node, which is a node with a projected sub-proof execution time less than a time limit. A split chain module determines if a split chain exists. The split chain includes a connection between potential split nodes from the input to the output at each execution cycle. A reporting module reports nodes of a split chain in response to determining that a split chain exists.

20 Claims, 15 Drawing Sheets

(51) Int. Cl.
*G06F 30/3323* (2020.01)
*G06F 30/327* (2020.01)
*G06F 30/27* (2020.01)
*G06N 20/00* (2019.01)
*G06F 111/04* (2020.01)
*G06F 111/20* (2020.01)
*G06F 30/367* (2020.01)
*G06F 30/30* (2020.01)
*G06F 30/31* (2020.01)
*G06F 111/06* (2020.01)

(52) U.S. Cl.
CPC .......... *G06F 30/3323* (2020.01); *G06F 30/30* (2020.01); *G06F 30/31* (2020.01); *G06F 30/367* (2020.01); *G06F 2111/04* (2020.01); *G06F 2111/06* (2020.01); *G06F 2111/20* (2020.01); *G06N 20/00* (2019.01)

(56) References Cited

U.S. PATENT DOCUMENTS

| 8,826,201 | B1 | 9/2014 | Hanna et al. |
| 10,466,982 | B2* | 11/2019 | Chiang ................ G06N 5/003 |
| 2005/0210429 | A1* | 9/2005 | Keller ................ G06F 30/367 |
| | | | 716/115 |
| 2015/0213167 | A1 | 7/2015 | Jain et al. |

OTHER PUBLICATIONS

Ram Narayan, Evolving the use of formal model checking in soc design verification, Mar. 2015, https://verificationacademy.com/verification-horizons/march-2015-volume-11-issue-1/Evolving-the-Use-of-Formal-Model-Checking-in-SoC-Design-Verification, last visited Jul. 9, 2018, 8 pages.

* cited by examiner

INTEGRATED CIRCUIT DESIGN MODEL SPLITTING FOR FORMAL VERIFICATION

BACKGROUND

The subject matter disclosed herein relates to circuit verification and more particularly relates to integrated circuit design model splitting for formal verification.

Formal verification is a method of determining if logic of a circuit has any errors or bugs. Formal verification is implemented by converting a design of an integrated circuit ("IC") into a simpler "verifiable" format. A typical design is specified as set of interacting systems where each system has a finite number of states. States and transitions between states may constitute finite state machines ("FSMs"). A circuit can be represented by representing each component in terms of a present state (or current configuration) and a next state (or successive configuration). The circuit may be represented by discrete functions, which may be represented in a binary decision diagram ("BDD"), which is a data structure that represents Boolean functions and/or a multi-valued decision diagram ("MDD"), which is a data structure that represents finite valued discrete functions. Components of an integrated circuit diagram may be placed in a netlist, which includes a list of components, nodes or connection points of the components, and possibly attributes of the components involved. In one embodiment, the netlist includes sufficient information to transform the netlist into BDDs, MDDs or other logic structure useful for formal verification. Other formal verification methods may use satisfaction-based ("SAT-based") state enumeration.

Algorithms for checking for design errors in the integrated circuit design are often called engines or algorithm engines and use a netlist along with user constraints, initial conditions, etc. for determining is design errors are present, which may be called "reachability analysis." A design error, such as an inverter with an input and an output that are a same value, are considered to be bugs. Formal verification uses one or more engines to determine if design errors or bugs are present in the integrated circuit design.

Often a netlist is complex enough to require exorbitant computational resources so execution of one or more engines may take days or weeks, or may take a large amount of memory, etc. In general, there is no clear dependency between the structure or size of an analyzed circuit and required resources. However, a smaller number of registers, gates, arrays, etc. often results in increased computational performance. Transformation-based verification ("TBV") is a form of formal verification where some engines are used to simplify a netlist by reducing redundant gates, inputs, registers, arrays, constraints, etc. so that a resultant modified netlist may be used that requires less computational resources and/or executes in less time. Multiple engines may be used for processing a netlist where each engine has different characteristics. For example, some engines may be good at reducing inputs while other engines may be good at reducing registers, other engines may be good at reducing AND gates, other engines may excel at verifying there are no design errors for a particular netlist or components in the netlist, etc. Some formal verification computer programs may have access to thirty or more engines.

One method of formal verification of a complex netlist of an integrated circuit design includes splitting the design. However, manually splitting the design results in arbitrary splits and may result in stages where a sub-proof is not possible.

SUMMARY

An apparatus for model splitting is disclosed. A computer-implemented method and computer program product also perform the functions of the apparatus. According to an embodiment of the present invention, the apparatus includes an extraction module that extracts netlist parameters from a static netlist. The netlist parameters include node parameters of each node of the static netlist. The node parameters include node connection information and execution cycle information, where the nodes of the static netlist include nodes of a portion of an integrated circuit design from an input to an output. The apparatus includes a split node module that analyzes, using the netlist parameters, each node in a cycle and determines if each node is a potential split node. A potential split node includes a node with a projected sub-proof execution time less than a sub-proof verification time limit. The apparatus includes a split chain module that determines if a split chain exists between the input and the output. The split chain includes a connection between potential split nodes from the input to the output at each execution cycle. The apparatus includes a reporting module that reports nodes of a split chain in response to the split chain module determining that a split chain exists. In some embodiments, at least a portion of the modules include hardware and/or executable code, where the executable code is stored on one or more computer readable storage media.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
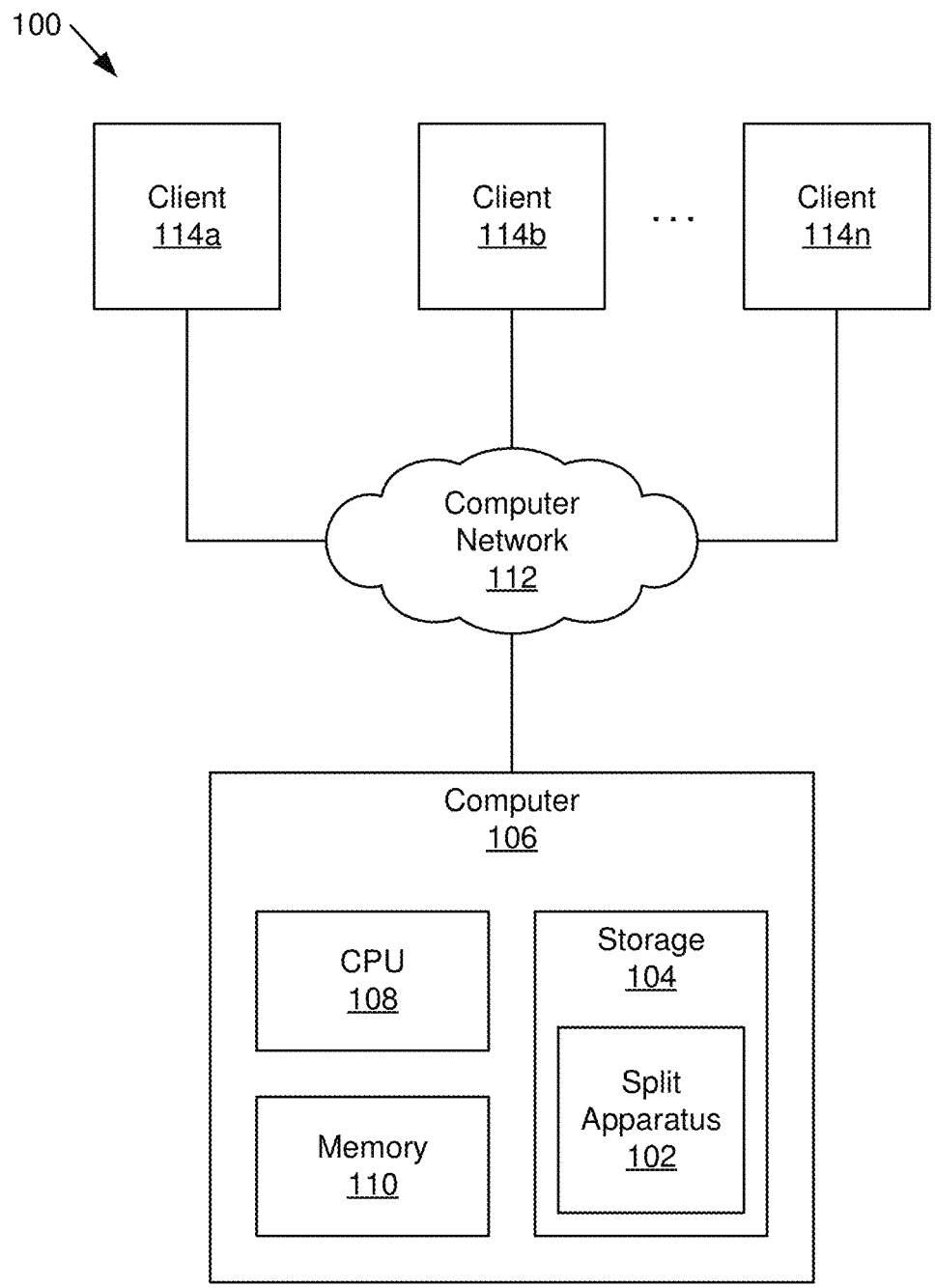
FIG. 1 is a schematic block diagram illustrating one embodiment of a system for splitting an integrated circuit design model for formal verification.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The description of elements in each figure may refer to elements of proceeding figures. Like numbers refer to like elements in all figures, including alternate embodiments of like elements.

An apparatus for model splitting is disclosed. A computer-implemented method and computer program product also perform the functions of the apparatus. According to an embodiment of the present invention, the apparatus includes an extraction module that extracts netlist parameters from a static netlist. The netlist parameters include node parameters of each node of the static netlist. The node parameters include node connection information and execution cycle information, where the nodes of the static netlist include nodes of a portion of an integrated circuit design from an input to an output. The apparatus includes a split node module that analyzes, using the netlist parameters, each node in a cycle and determines if each node is a potential split node. A potential split node includes a node with a projected sub-proof execution time less than a sub-proof verification time limit. The apparatus includes a split chain module that determines if a split chain exists between the input and the output. The split chain includes a connection between potential split nodes from the input to the output at each execution cycle. The apparatus includes a reporting module that reports nodes of a split chain in response to the split chain module determining that a split chain exists. In some embodiments, at least a portion of the modules include hardware circuits, a programmable hardware device and/or executable code, where the executable code is stored on one or more computer readable storage media.

In some embodiments, the apparatus includes a static netlist module that generates the static netlist from a proto file of the portion of the integrated circuit design. In other embodiments, the apparatus includes a data path waveform module that generates a data path waveform for the portion of the integrated circuit design, where the extraction module extracts the netlist parameters from the static netlist and the data path waveform. In other embodiments, the extraction module includes a data flow module that generates a data flow diagram from the netlist parameters. The data flow diagram includes a determination of which nodes of the nodes of the static netlist are in each execution cycle and/or data connections between the nodes of the static netlist. The split node module determines if a node is a potential split node using the data flow diagram.

In some embodiments, each potential split node in a split chain includes a split node and the apparatus includes a sub-proof module that runs a formal verification engine on each split node of a split chain, and a verification module that determines that the portion of the integrated circuit design is verified in response to the sub-proof module obtaining a sub-proof for each split node in a split chain pathway between the input and the output. In other embodiments, the split node module determines if a node in an execution cycle is a potential split node by using information from one of nodes in a subsequent execution cycle and the output to determine if the projected sub-proof execution time less than the sub-proof verification time limit. In other embodiments, the sub-proof verification time limit is within a range from 15 minutes to 4 hours.

In some embodiments, the split node module uses a machine learning inference algorithm to determine if a node is a potential split node. In further embodiments, the machine learning inference algorithm uses normalized execution history information for a plurality of formal verification engines to determine if a node is a potential split node. In other embodiments, the netlist parameters include design parameters and target parameters. The design parameters include a quantification of a scale of the integrated circuit design and/or design specific information. The target parameters include a determination of whether a reference design represents a portion of the integrated circuit design and/or a quantification of a scale of a reduced design. The reduced design includes a modified netlist derived from the netlist of the integrated circuit design using a reduction engine of transformation-based verification. In other embodiments, the apparatus includes a stage module that identifies the portion of the integrated circuit design that is the source for the static netlist. The stage module identifies the portion of the integrated circuit design by identifying a portion of the integrated circuit design that is relatively difficult to obtain a verification for the portion of the integrated circuit design using formal verification.

A computer-implemented method for model splitting in formal verification includes extracting netlist parameters from a static netlist. The netlist parameters include node parameters of each node of the static netlist. The node parameters include node connection information and execution cycle information. The nodes of the static netlist include nodes of a portion of an integrated circuit design from an input to an output. The computer-implemented method includes analyzing, using the netlist parameters, each node in a cycle and determining if each node is a potential split node. A potential split node includes a node with a projected sub-proof execution time less than a sub-proof verification time limit. The computer-implemented method includes determining if a split chain exists between the input and the output. The split chain includes a connection between potential split nodes from the input to the output at each execution cycle. The computer-implemented method includes reporting nodes of a split chain in response to the split chain module determining that a split chain exists.

In some embodiments, the computer-implemented method includes generating the static netlist from a proto file of the portion of the integrated circuit design. In other embodiments, the computer-implemented method includes generating a data path waveform for the portion of the integrated circuit design, where extracting the netlist parameters includes extracting the netlist parameters from the static netlist and the data path waveform. In other embodiments, the computer-implemented method includes generating a data flow diagram from the netlist parameters. The data flow diagram comprising one or more of a determination of which nodes of the nodes of the static netlist are in each execution cycle and data connections between the nodes of the static netlist, where determining if a node is a potential split node includes determining if a node is a potential split node using the data flow diagram.

In some embodiments, each potential split node in a split chain includes a split node and the computer-implemented method includes running a formal verification engine on each split node of a split chain and determining that the portion of the integrated circuit design is verified in response to obtaining a sub-proof for each split node in a split chain pathway between the input and the output. In other embodiments, determining if a node in an execution cycle is a potential split node includes using information from one of nodes in a subsequent execution cycle and the output to determine if the projected sub-proof execution time less than the sub-proof verification time limit.

A computer program product is provided for model splitting in formal verification. The computer program product includes a computer readable storage medium having program instructions embodied therewith. The program instructions are executable by a processor to cause the processor to extract netlist parameters from a static netlist. The netlist parameters include node parameters of each node of the static netlist. The node parameters include node connection information and execution cycle information. The nodes of the static netlist include nodes of a portion of an integrated circuit design from an input to an output. The program instructions are executable by a processor to cause the processor to analyze, using the netlist parameters, each node in a cycle and determine if each node is a potential split node. A potential split node includes a node with a projected sub-proof execution time less than a sub-proof verification time limit. The program instructions are executable by a processor to cause the processor to determine if a split chain exists between the input and the output, where the split chain includes a connection between potential split nodes from the input to the output at each execution cycle, and to report nodes of a split chain in response to the split chain module determining that a split chain exists.

In some embodiments, the computer program product includes program instructions further causing the processor to generate the static netlist from a proto file of the portion of the integrated circuit design. In other embodiments, the computer program product includes program instructions further causing the processor to generate a data path waveform for the portion of the integrated circuit design, where extracting the netlist parameters includes extracting the netlist parameters from the static netlist and the data path waveform. In other embodiments, the computer program product includes program instructions further causing the processor to generate a data flow diagram from the netlist parameters. The data flow diagram includes a determination of which nodes of the nodes of the static netlist are in each execution cycle and/or data connections between the nodes of the static netlist. Determining if a node is a potential split node includes determining if a node is a potential split node using the data flow diagram.

In other embodiments, the computer program product includes program instructions further causing the processor to determine if a node in an execution cycle is a potential split node includes using information from one of nodes in a subsequent execution cycle and the output to determine if the projected sub-proof execution time less than the sub-proof verification time limit. In other embodiments, each potential split node in a split chain includes a split node and the program instructions further causing the processor to run a formal verification engine on each split node of a split chain and determine that the portion of the integrated circuit design is verified in response to obtaining a sub-proof for each split node in a split chain pathway between the input and the output.

FIG. 1 is a schematic block diagram illustrating one embodiment of a system 100 for splitting an integrated circuit design model for formal verification. The system 100 includes a split apparatus 102 in storage 104 of a computer 106, a central processing unit ("CPU") 108, memory 110, a computer network 112 and clients 114a, 114b, . . . 114n (collectively or generically "114"), which are described below.

The system 100 includes a split apparatus 102, which is used to identify a split chain for verification of an integrated circuit. In the depicted embodiment, the split apparatus 102 is shown in storage 104 of the computer 106. In other embodiments, all or part of the split apparatus 102 may be located elsewhere and may be implemented using hardware circuits, a programmable hardware device, executable code stored in a non-transitory computer readable storage medium, etc. For example, the split apparatus 102 may be located in non-volatile storage 104, such as a hard disk drive, and all or a portion of the split apparatus 102 may be read into the memory 110 as needed. In other embodiments, the split apparatus 102 may be implemented using an FPGA or similar device. All or parts of the split apparatus 102 may also be implemented using hardware circuits. In some embodiments, the split apparatus 102 is a tool for verification. In another embodiment, the split apparatus 102 is a plug-in or may be added to an existing verification tool.

The split apparatus 102 extracts, for at least a portion of an integrated circuit design, netlist parameters from a static netlist and possibly a data path waveform and analyzes nodes to determine if the nodes are potential split nodes. The split apparatus 102 determines from the potential split nodes whether or not a split chain exists, which is a pathway through potential split nodes that are connected from an input to an output. The split apparatus 102 determines if a node is a potential split node by determining if potential execution time for the node is less than a sub-proof verification time limit. The split apparatus 102 then executes a formal verification algorithm for each split node in the split chain to verify the design of the portion of the integrated circuit design used to generate the static netlist. The split apparatus 102 is described in more detail with regard to the apparatuses 200, 300 of FIGS. 2 and 3.

The computer 106, in various embodiments, may be a server, a workstation computer, a mainframe computer, a desktop computer, or other computer capable of transformation-based verification. The computer 106 may include one CPU 108 or multiple CPUs 108 where each CPU 108 may include multiple processors. In one embodiment, the computer 106 may include numerous blade servers controlled by a baseboard management controller ("BMC") or a mainframe computer with multiple processors. In some embodiment, the computer 106 may include two or more computers operating together, such as in a cloud computing environment. In other embodiments, the computer 106 may be desktop computer capable of execution of the split apparatus 102. The computer 106, in one embodiment, is a dedicated purpose computer or machine, which may include an FPGA, PLA or other programmable computing device. One of skill in the art will recognize other platforms for execution of the split apparatus 102.

The computer 106 may include storage 104 of some type, such as a hard disk drive, optical storage, solid-state storage, etc. In some embodiments, the computer 106 is coupled to external storage, such as through a storage area network ("SAN"). The computer 106 includes memory 110, such as cache, RAM, etc. Formal verification, TBV, etc. may use a considerable amount of memory 110, which limits performance of the computer 106.

In some embodiments, the computer 106 is a server connected to one or more clients 114 through a computer network 112. The computer network 112 may include a LAN, a WAN, a fiber network, the Internet, a wireless network, or a combination of networks. A client 114 may be any form of computer capable of connecting to the server and may be used to control execution of the split apparatus 102. One of skill in the art will recognize other computers 106 and computing environments appropriate for execution of the split apparatus 102.

Figure 2:
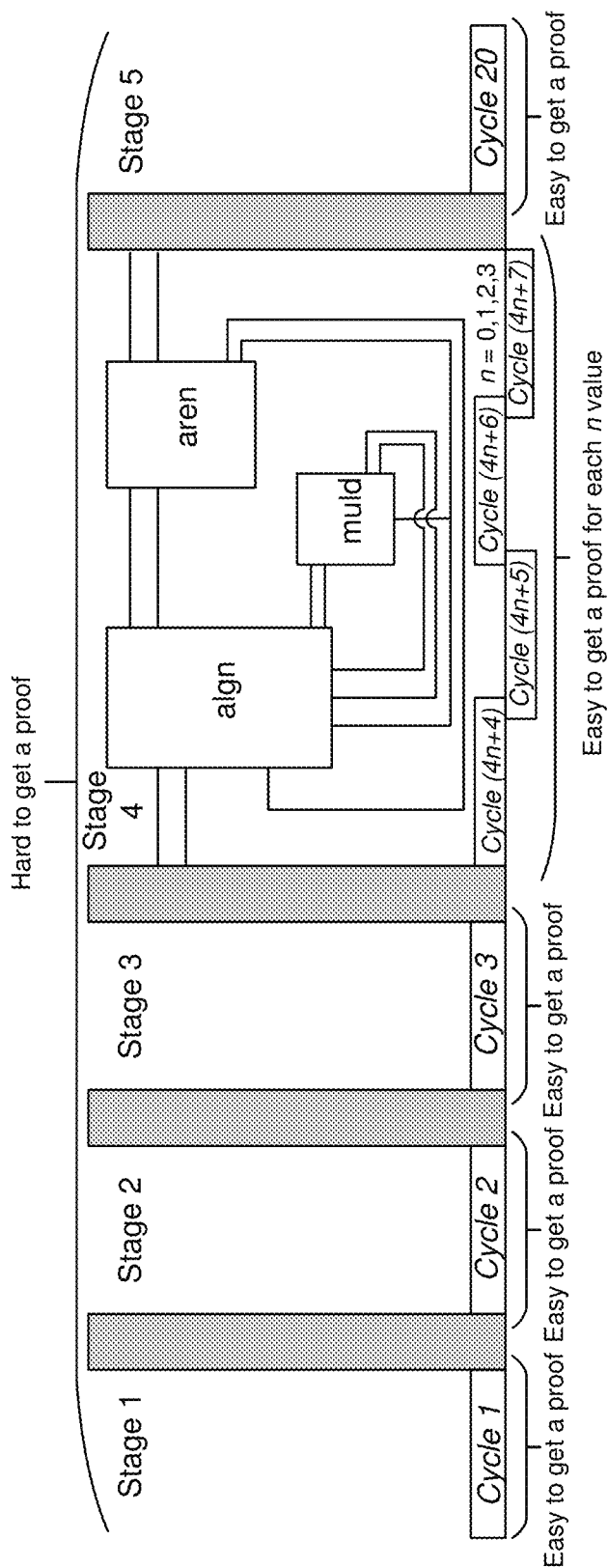
FIG. 2 is a schematic block diagram illustrating an integrated circuit design model with a difficult stage.

FIG. 2 is a schematic block diagram illustrating an integrated circuit design model with a difficult stage. FIG. 2 depicts an integrated circuit design model broken into stages where some stages are for a single cycle and may be relatively easy to analyze to get a sub-proof of the overall verification process. Obtaining a sub-proof at each stage, in some embodiments, results in an overall proof or verification of the integrated circuit design. While a sub-proof may be relatively simple to obtain for some states, such as stages 1-4 and 5, a sub-proof for stage 4 may be difficult due to complexity of the stage. FIG. 2, in some embodiments, depicts a manual split, which is typically arbitrary and often results in a stage where a sub-proof is difficult. The split apparatus 102 provides a better way to find a split chain that typically results in an overall verification of the integrated circuit design or a portion of the integrated circuit design. The split apparatus 102, in some embodiments, is a computer-implemented method that replaces manual splitting and results in verification of many integrated circuit designs that otherwise wouldn't be possible using conventional splitting techniques.

Figure 3:
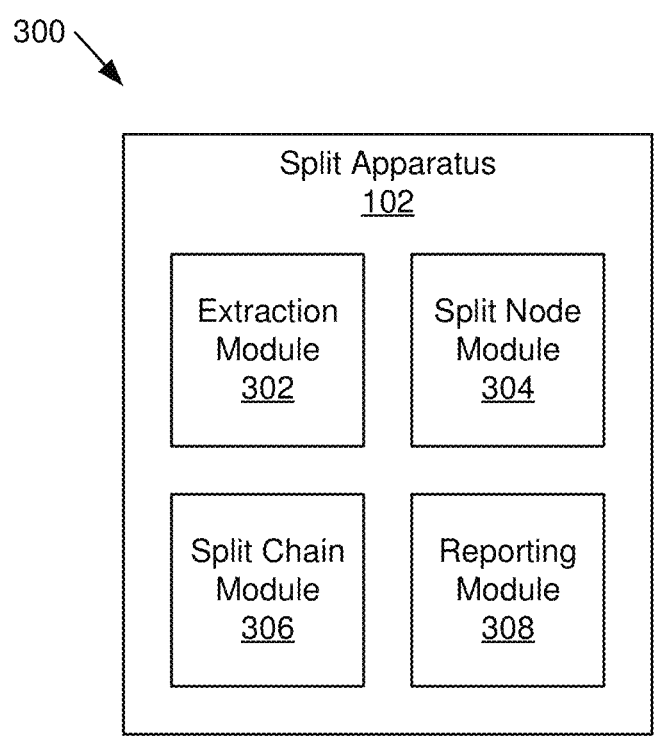
FIG. 3 is a schematic block diagram illustrating one embodiment of an apparatus for splitting an integrated circuit design model for formal verification.

FIG. 3 is a schematic block diagram illustrating one embodiment of an apparatus 300 for splitting an integrated circuit design model for formal verification. The apparatus 300 includes one embodiment of the split apparatus 102 with an extraction module 302, a split node module 304, a split chain module 306 and a reporting module 308, which are described below.

The apparatus 300 includes an extraction module 302 that extracts netlist parameters from a static netlist. A static netlist is a netlist of all or a portion of an integrated circuit design that does not include timing and includes nodes, connections between nodes, logic, inputs, outputs, etc. In some embodiments, the static netlist is generated from a proto file or netlist of the integrated circuit design. In other embodiments, the static netlist is derived using a tool that automatically generates the static netlist from the proto file or netlist. The tool is described below in more detail with regard to the static netlist module 402.

Figure 7:
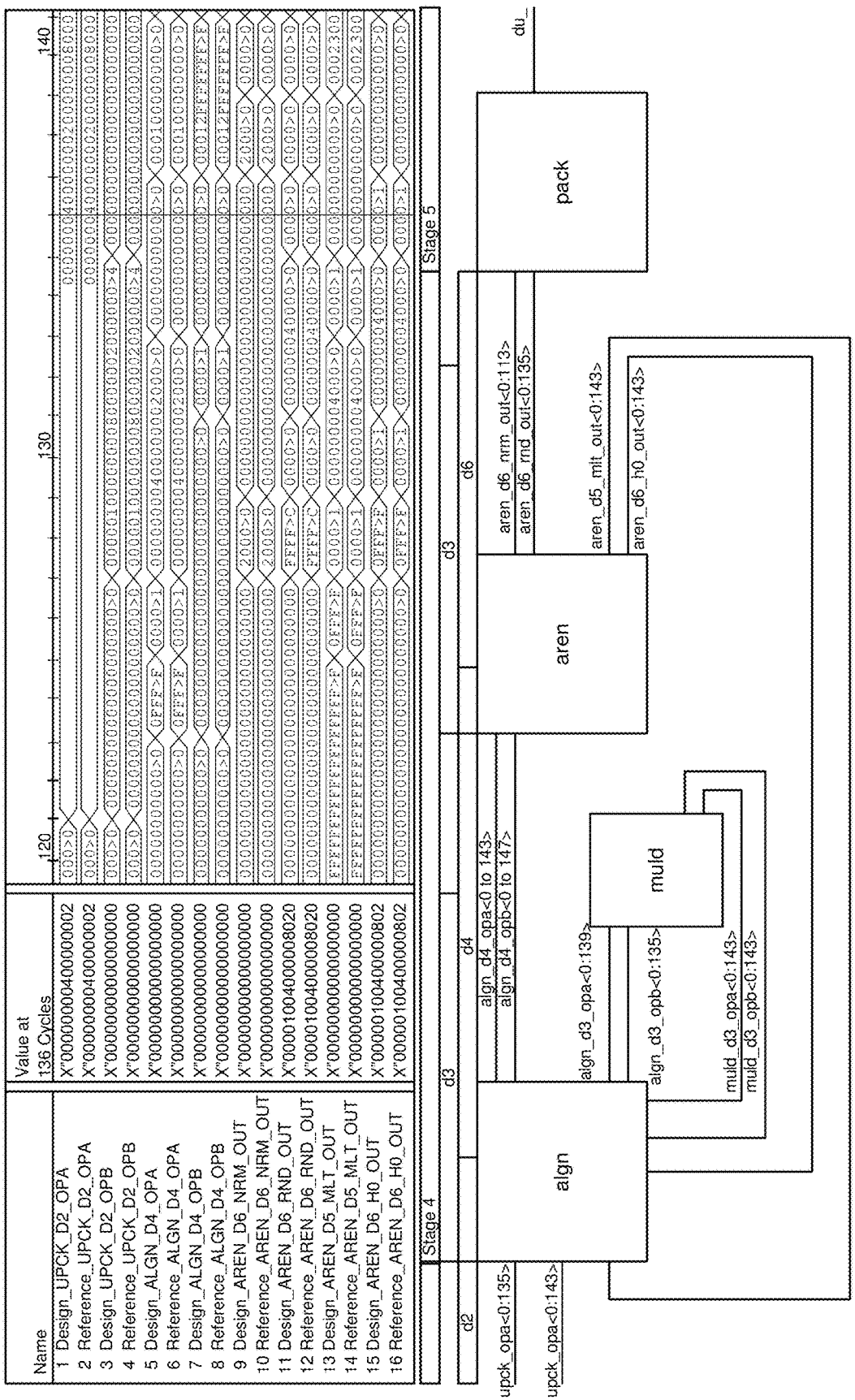
FIG. 7 is an illustration of one embodiment of a data path waveform and a static netlist.

The netlist parameters include node parameters of each node of the static netlist. A node, in some embodiments, is a device, such as a register, AND gate, or other logical device. A node, in other embodiments, is an input or an output, for example at an edge of an integrated circuit design or portion thereof. The node parameters include node connection information and execution cycle information. In some examples, the node connection information includes which nodes connect to each other. For example, an output node 4 may be connected to an input of node 5. In some embodiments, the connection information includes which input or output of a device is connected. In one example, output 1 of node 4 is connected to input 2 of node 5. In other embodiments, connections are represented with a text string, symbol, etc. For example, a connection may be represented as "algn_d4_opa<0 to 143>," as depicted in FIG. 7, which identifies a node "algn," a data port number "d4," etc. One of skill in the art will recognize other ways to represent connection information of a node.

Execution cycle information of a node, in some embodiments, includes input and output values during a particular clock cycle. In one example, an input to a register may go from low to high during one clock cycle and on a subsequent clock cycle the output of the register goes from low to high. The static netlist differs from other netlists in that timing information is not included, such as how long an output of a node will take to transition from one state to another after assertion of one or more inputs to the node.

In some embodiments, the nodes of the static netlist include nodes of a portion of an integrated circuit design from an input to an output. For example, nodes may connect to an input and to a next node, the next node may connect to other nodes, etc. until there is a pathway from input to output of an integrated circuit design or portion of an integrated circuit design under study.

In some embodiments, the netlist parameters include design parameters. In some embodiments, a design parameter includes a quantification of a size, scope, etc. of an initial netlist of an integrated circuit design. Knowing a size helps to determine complexity, projected execution times, etc. The design parameters, in some embodiments, includes design specific information, such as number of AND gates, registers, inputs, outputs, and the like.

In some embodiments, the netlist parameters include target parameters. Target parameters include, for instance, an assertion that a portion of the integrated circuit design and a reference design are the same, have the same output, etc. A reference design, in some embodiments, includes a known integrated circuit design with reliable or proven functionality where a portion of the integrated circuit design under study is a reference design, performs the same as a reference design, etc. Knowing that a portion of the integrated circuit design correlates to a reference design is useful in that the reference design may be verified to not have design flaws, may be verified with a particular verification engine, etc.

Target parameters, in some embodiments, include a quantification of a scale of a reduction. For example, a verification engine in transformation-based verification may be used with an initial netlist and may reduce inputs by 20 percent. A target parameter may quantify the reduction of inputs, which is used, in some embodiments, to determine execution time, selection of a verification engine, etc. Target parameters, in other embodiments, include constraint information, such as allocated memory for execution, an execution time limit, and the like.

The apparatus 300 includes a split node module 304 that analyzes, using the netlist parameters, each node in a cycle and determines if each node is a potential split node. A potential split node includes a node with a projected sub-proof execution time less than a sub-proof verification time limit. The split node module 304 includes, in some embodiments, one or more algorithms that predict execution time for obtaining a sub-proof of verification of a particular node. The split node module 304, in some embodiments, uses a history buffer that includes execution results, which may be used to identify a typical execution time for a similar netlist or node of a netlist. The sub-proof verification time limit is a time limit for execution where a longer time limit would cause undue hardship in obtaining a sub-proof of a node. The sub-proof verification time limit, in some embodiments may be an hour, two hours, a day, 10 minutes, 1 minute, etc. in some examples, the sub-proof verification time limit is within a range from 15 minutes to 4 hours. For example, a sub-proof verification time limit of 1 hour for a netlist with 100 nodes may present a worst-case overall execution time of 100 hours. One of skill in the art will recognize other sub-proof verification time limits in relation to a netlist size, computing resources, deadlines, and the like.

In some embodiments, the split node module 304 uses a machine learning inference algorithm to determine if a node is a potential split node. In one example, the machine learning inference algorithm is TensorFlow™, which is an open-source software library for dataflow programming across a range of tasks. In another example, the machine learning algorithm inference is Caffe. In some embodiments, the machine learning inference algorithm is implemented using PowerAI™ by IBM®, which is an enterprise software distribution of open source deep learning frameworks. In other embodiments, the machine learning inference algorithm is implemented using NVIDIA® Deep Learning Accelerator (NVDLA).

In one example, the machine learning inference algorithm uses normalized execution history information for a plurality of formal verification engines to determine if a node is a potential split node. In some examples, execution information is stored in a history buffer and execution time is evaluated for various formal verification engines. The execution times are normalized for each node and compared with the sub-proof verification time limit.

The apparatus 300 includes a split chain module 306 that determines if a split chain exists between the input and the output. The split chain includes a connection between potential split nodes from the input to the output at each execution cycle. For example, a split chain is evidence that verification may be achieved from an input to an output of an integrated circuit design because execution time of potential split nodes in the split chain all have a projected execution time less than the sub-proof verification time limit so that the overall execution time to obtain verification of the integrated circuit design from input to output is less than an acceptable limit. If a split chain includes five nodes and the sub-proof verification time limit is one hour, the overall execution time, in some embodiments, would be less than or equal to 5 hours.

The apparatus 300 includes a reporting module 308 that reports nodes (or split nodes) of a split chain in response to the split chain module 306 determining that a split chain exists. In some embodiments, the reporting module 308 reports the nodes of a split chain to a user. The user may then execute a verification engine to obtain a sub-proof for each split node in the split chain. In other embodiments, the reporting module 308 reports the split nodes of a split chain to one or more modules that obtain a sub-proof for each split nodes. The reporting module 308 may also report that no split chain was found, which may indicate a design error in the integrated circuit design or may indicate that only a partial proof may be obtained. One of skill in the art will recognize other information to be reported by the reporting module 308.

Figure 4:
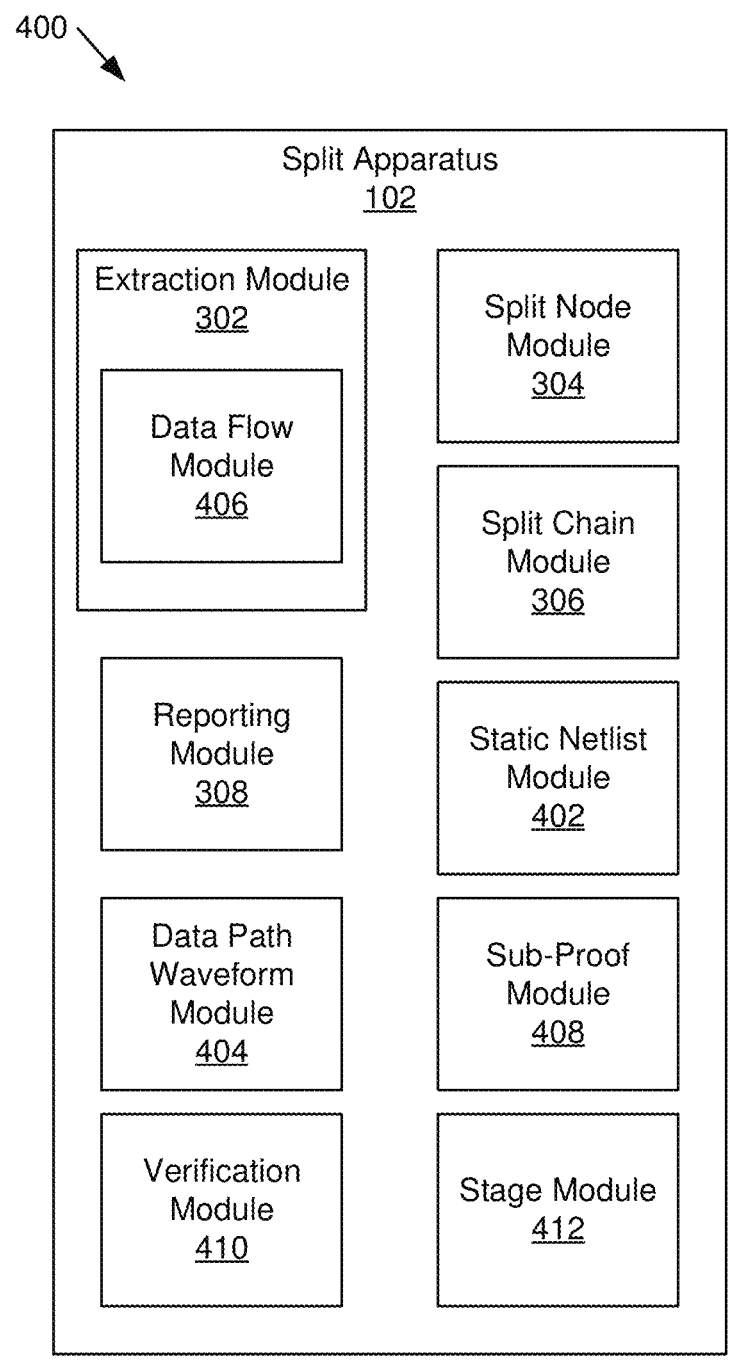
FIG. 4 is a schematic block diagram illustrating another embodiment of an apparatus for splitting an integrated circuit design model for formal verification.

FIG. 4 is a schematic block diagram illustrating another embodiment of an apparatus 400 for splitting an integrated circuit design model for formal verification. The apparatus includes one embodiment of the split apparatus 102 with an extraction module 302, a split node module 304, a split chain module 306 and a reporting module 308, which are substantially similar to those described in relation with the apparatus 300 of FIG. 3. The apparatus 400 also includes one or more of a static netlist module 402, a data path waveform module 404, a data flow module 406 in the extraction module 302, a sub-proof module 408, a verification module 410 and/or a stage module 412, which are described below.

The apparatus 400 includes, in some embodiments, a static netlist module 402 that generates the static netlist from a proto file of the portion of the integrated circuit design. In some examples, the static netlist module 402 automatically generates the static netlist from a proto file. The proto file, in some embodiments, is a file derived from a model of the integrated circuit design. In some embodiments, the proto file is a netlist of the integrated circuit design. The proto file, in some embodiments, includes timing information and the static netlist module 402 creates a static netlist from the proto file that does not include timing information. In some examples, the proto file is for an entire integrated circuit design. In other embodiments, the proto file is from a portion of the integrated circuit design. In other embodiments, the proto file is from a reduced netlist from execution results of a verification algorithm that reduces a netlist. One of skill in the art will recognize other elements of a proto file and other functions of a tool in the form of the static netlist module 402.

The apparatus 400 includes, in some embodiments, a data path waveform module 404 that generates a data path waveform for the portion of the integrated circuit design, where the extraction module 302 extracts the netlist parameters from the static netlist and the data path waveform. The data path waveform module 404, in one embodiment, generates a data path waveform similar to the data path waveform in the top half of FIG. 7. FIG. 7 is an illustration of one embodiment of a data path waveform and a static netlist diagram. The data path waveform, in some embodiments, includes a cycle-by-cycle analysis of signals of nodes in the portion of the integrated circuit design under test.

As depicted in FIG. 7, the data path waveform includes a value for each displayed signal and may also include a value for other signals not in the display, which may be available by scrolling, selection of signals, and other techniques known to those of skill in the art. In the depicted embodiment, values for signals 1-16 in the left window are displayed for cycle 136 in the center window along with a representation of values of the signals for cycles 120 to 141 in the right window. The signals, in some embodiments, represent values of inputs and outputs of nodes of the portion of the integrated circuit design under test. The values may simple logic values of 0 or 1 or may represent a data bus with two or more bits. For example, signal 14 labeled Reference_AREN_D5_MLT_OUT ranges in values from 0 to F.

The bottom half of FIG. 7 depicts a representation of a static netlist in diagram form. The static netlist diagram includes a portion of the nodes in the data path waveform and displays connections between nodes. For example, node "algn" is connected to node "muld" and one signal is listed as "algn_d3_opa<0:139>. In one embodiment, the static netlist diagram is created manually for illustration purposes and is replaced by the output of the static netlist module 402. In other embodiments, the static netlist module 402 automatically produces a diagram similar to the static netlist diagram of FIG. 7.

The extraction module 302, in some embodiments, uses both the static netlist and the data path waveform to extract netlist parameters. In some cases, the static netlist is sufficient to derive needed netlist parameters. In other embodiments, the static netlist is insufficient to derive the netlist parameters and the extraction module 302 uses both the static netlist and the data path waveform.

The apparatus 400 includes, in some embodiments, includes an extraction module 302 with a data flow module 406 that generates a data flow diagram from the netlist parameters. The data flow diagram includes a determination of which nodes of the nodes of the static netlist are in each execution cycle and/or data connections between the nodes of the static netlist. The split node module 304 determines if a node is a potential split node using the data flow diagram. One embodiment of a data flow diagram is depicted in FIG. 9.

Figure 9:
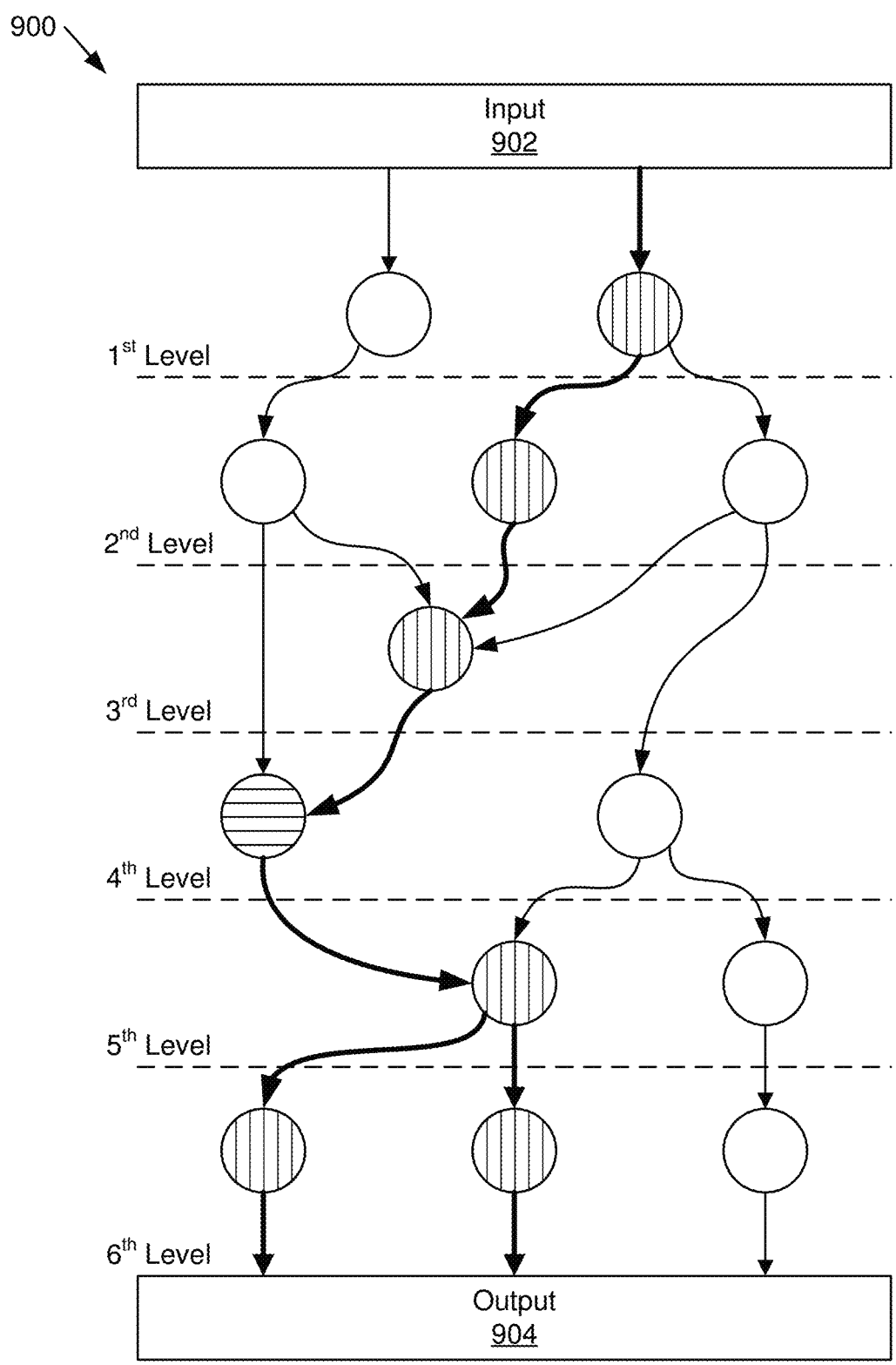
FIG. 9 is a schematic block diagram illustrating one embodiment of a data flow diagram.

FIG. 9 is a schematic block diagram illustrating one embodiment of a data flow diagram 900. The data flow diagram 900 includes an input 902 and an output 904, which may represent inputs and outputs of the portion of the integrated circuit design under test. The data flow diagram 900 includes nodes represented by circles and connections are represented by arrows. The nodes are separated into levels where a level represents a clock cycle. In one embodiment, the extraction module 302 creates a data flow diagram with the nodes divided into levels where each level is a clock cycle. For example, the extraction module 302 determines when a node changes state and places the node in a level corresponding to the clock cycle when the node changed state. The node, in some embodiments, represents a device and a static netlist and/or data flow diagram may include several nodes corresponding to a single device where the device changes state more than once during a formal verification analysis.

The data flow diagram 900 of FIG. 9 depicts a split chain as nodes with a vertical cross hatch and associated arrows that are darker than other arrows. Note that the split chain extends from the input 902 to the output 904. In some embodiments, the split chain indicates that a proof may be obtained from the input 902 to the output 904, which may represent a portion of the integrated circuit design or an entire integrated circuit design, depending on how the static netlist and/or data path waveform were derived.

In instances where the split node module 304 identifies potential split nodes but there is not a potential split node on a particular level so that there is not a continuous split chain from the input 902 to the output 904, the split chain module 306 determines that a split chain does not exist and/or identifies a partial split chain. A partial split chain, in some cases, is useful and users may use a partial split chain to provide partial verification of an integrated circuit design. While the data flow module 406 may produce a data flow diagram similar to the data flow diagram 900 of FIG. 9, one of skill in the art will recognize other representations of a data flow diagram useful in identifying a split chain.

In some embodiments, the apparatus 400 includes a sub-proof module 408 that runs a formal verification engine on each split node of a split chain and the apparatus 400 includes a verification module 410 that determines that the portion of the integrated circuit design is verified in response to the sub-proof module 408 obtaining a sub-proof for each split node in a split chain pathway between the input and the output. For example, once the split chain module 306 identifies a split chain, the sub-proof module 408 executes a formal verification engine on each split node identified as part of the split chain. The verification module 410 then reports that the portion of the integrated circuit design is verified. Where the sub-proof module 408 does not obtain a sub-proof for each node of the split chain, the verification module 410, in some embodiments, reports a partial proof or that the portion of the integrated circuit design under test is not verified.

In some embodiments, the apparatus 400 includes a stage module 412 that identifies the portion of the integrated circuit design that is the source for the static netlist. The stage module 412 identifies the portion of the integrated circuit design by identifying a portion of the integrated circuit design that is relatively difficult to obtain a verification for the portion of the integrated circuit design using formal verification. As discussed with regard to FIG. 2, it may be easy to obtain a verification for some stages (e.g. 1-3, 5) of a netlist of a portion or all of a model of an integrated circuit design while it may be difficult to obtain a verification for one or more stages (e.g. stage 4). The stage module 412 may identify a difficult stage to be used by the split apparatus 102 to find a split chain.

In some embodiments, the stage module 412 executes a verification engine for each stage and may obtain a verification for some stages. The stage module 412 may struggle with a stage and may identify the stage as input for the split apparatus 102. In one embodiment, the stage module 412 may identify an excessive execution time as a reason to identify a stage as input for the split apparatus 102. In other embodiments, the stage module 416 identifies other parameters that indicate that verification will be difficult for a stage. For example, the stage module 412 may determine that verification for a stage will take too much time, may take too much memory, may have too many registers, etc.

where one or more of the parameters indicate that verification would be difficult or not possible.

Figure 5:
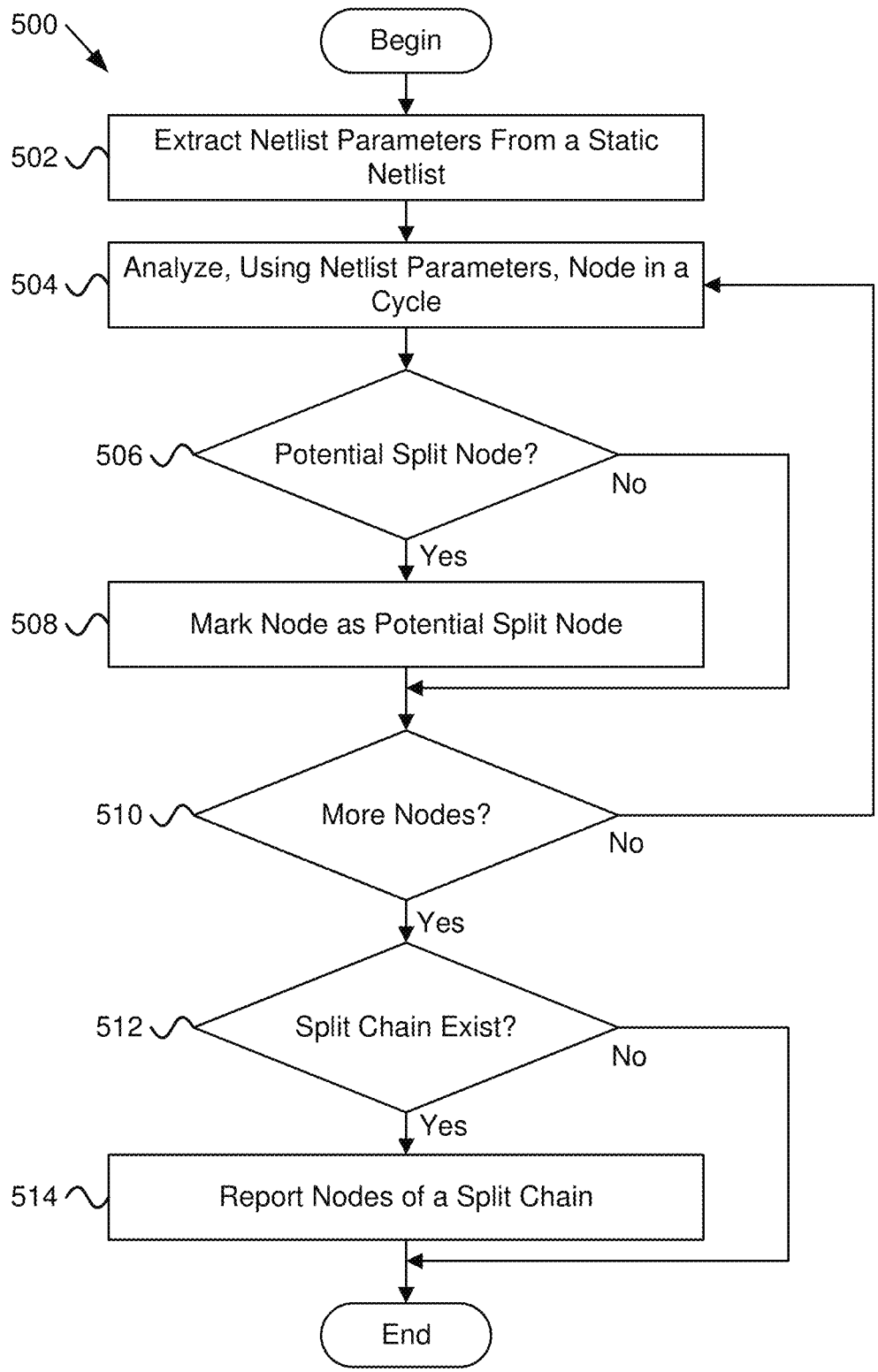
FIG. 5 is a schematic flow chart diagram illustrating one embodiment of a method for splitting an integrated circuit design model for formal verification.

FIG. 5 is a schematic flow chart diagram illustrating one embodiment of a computer-implemented method 500 for splitting an integrated circuit design model for formal verification. The method 500 begins and extracts 502 netlist parameters from a static netlist. The netlist parameters include node parameters of each node of the static netlist and the node parameters include node connection information and execution cycle information. The nodes of the static netlist include nodes of a portion of an integrated circuit design from an input to an output. The computer-implemented method 500 analyzes 504, using the netlist parameters, a node in a cycle and determines 506 if the node is a potential split node. A potential split node is a node with a projected sub-proof execution time less than a sub-proof verification time limit. If the computer-implemented method 500 determines 506 that the node is a potential split node, the computer-implemented method 500 marks 508 the node as a potential split node and determines 510 if there are more nodes to be evaluated. If the computer-implemented method 500 determines 560 that the node is not a potential split node, the computer-implemented method 500 determines 510 if there are more nodes to be evaluated.

If the computer-implemented method 500 determines 510 that there are more nodes to be evaluated, the computer-implemented method 500 returns and analyzes 504, using netlist parameters, another node and determines 506 if the node is a potential split node. If the computer-implemented method 500 determines 510 that there are no more nodes to be evaluated, the computer-implemented method 500 determines 512 if a split chain exists between the input and the output. The split chain includes a connection between potential split nodes from the input to the output at each execution cycle, for example, as depicted in FIG. 9.

If the computer-implemented method 500 determines 512 that a split chain exists, the computer-implemented method 500 reports 514 the nodes of the split chain and the computer-implemented method 500 ends. If the computer-implemented method 500 determines 512 that a split chain does not exist, the computer-implemented method 500 ends. In various embodiments, a part or all of computer-implemented method 500 is implemented by the extraction module 302, the split node module 304, the split chain module 306, and the reporting module 308.

Figure 6:
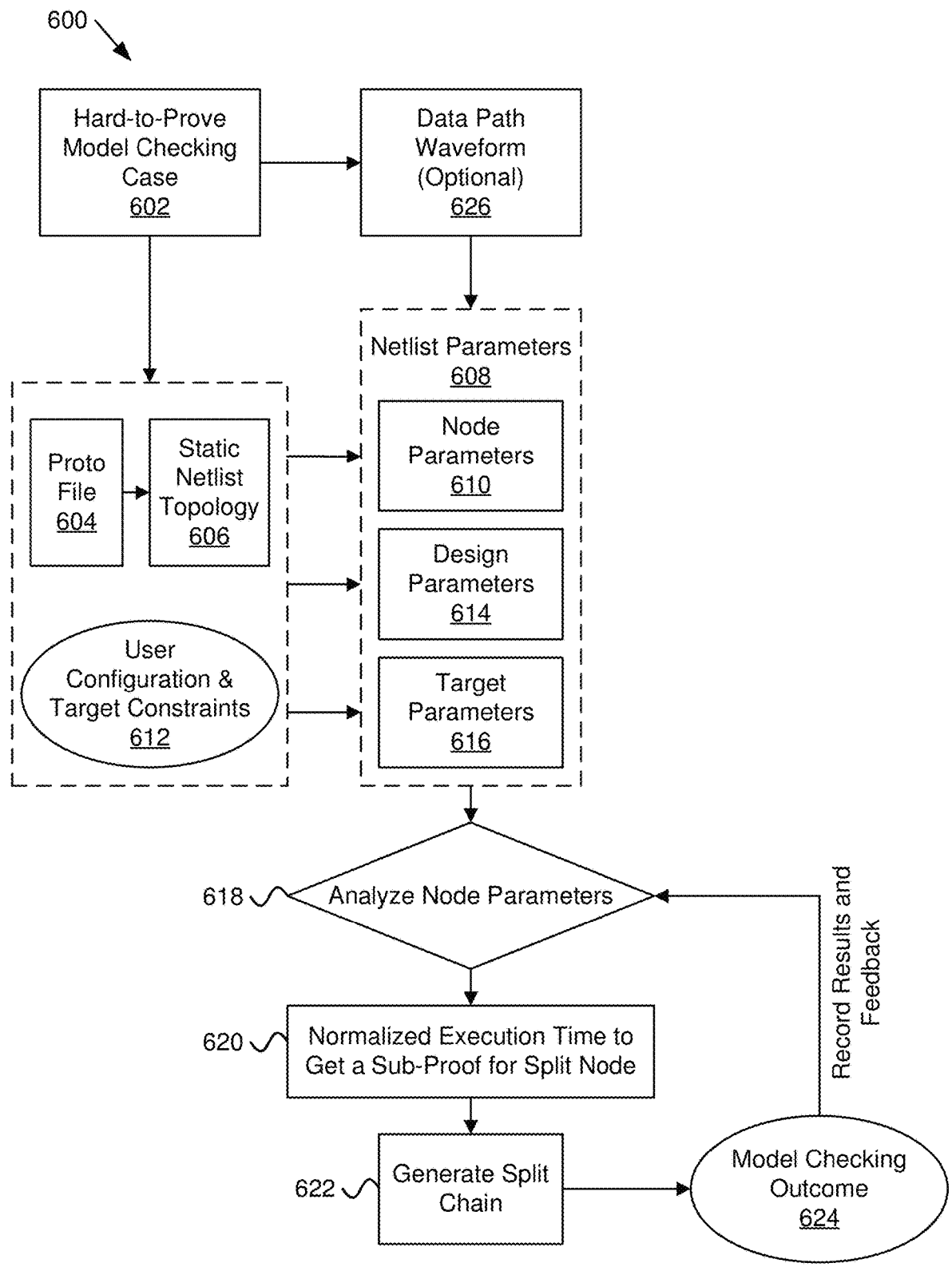
FIG. 6 is a schematic flow chart diagram illustrating another embodiment of a method for splitting an integrated circuit design model for formal verification.

FIG. 6 is a schematic flow chart diagram illustrating another embodiment of a method 600 for splitting an integrated circuit design model for formal verification. A hard-to-prove model checking case 602, for example, identified by the stage module 412, is used to generate or identify a proto file 604. The static netlist module 402 generates a static netlist 606 from the proto file 604. The extraction module 302 extracts netlist parameters 608 from a static netlist 606 where the netlist parameters 608 include node parameters 610. In some embodiments, the extraction module 302 or other portion of the split apparatus 102 uses a user configuration and target constraints 612 to extract design parameters 614 and/or target parameters 616.

In some embodiments, the data path waveform module 404 optionally generates a data path waveform 626 for the portion of the integrated circuit design. The extraction module 302 extracts the netlist parameters 608 from the static netlist 606 and the data path waveform 626.

The split node module 304 analyzes 618 the node parameters 610 and determines 620 a normalized execution time for each node to get a sub-proof for the split node. The split node module 304 repeats the process for each node to identify potential split nodes. The split chain module 306 then generates 622 a split chain, if a split chain exists, and the sub-proof module 408 and verification module 410 checks 624 the model outcome to verify the integrated circuit design and the reporting module 308 records results and feedback.

Figure 8:
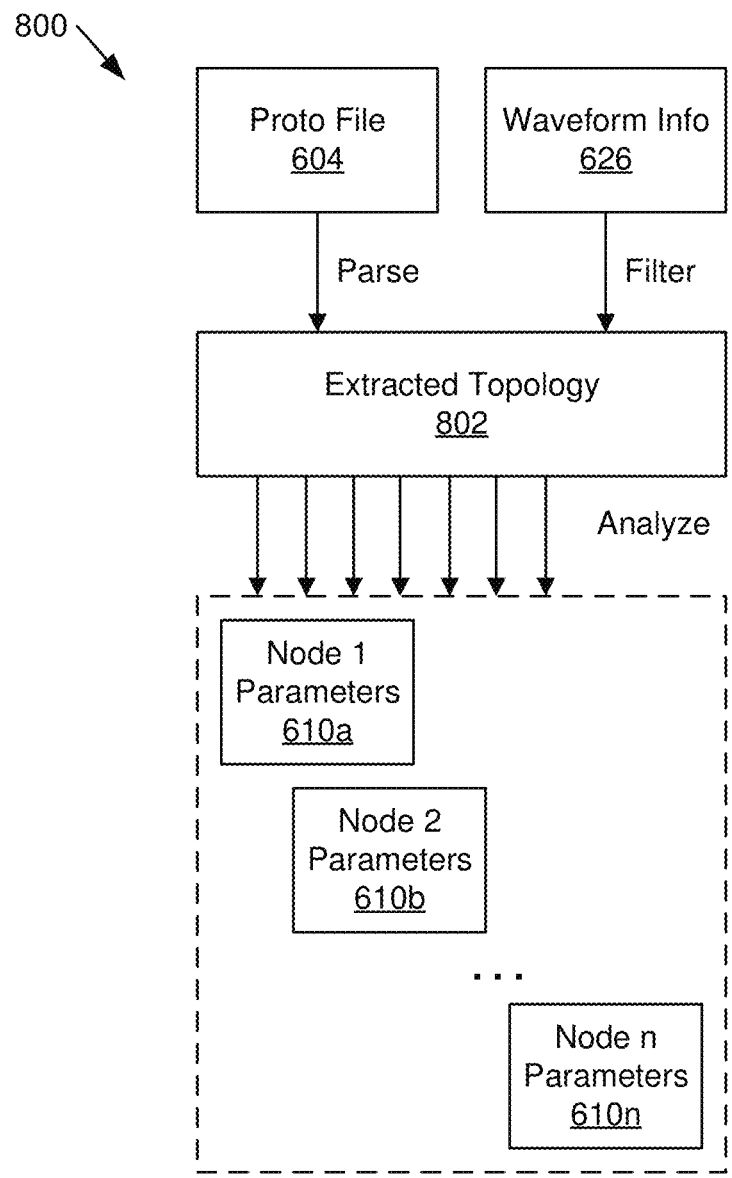
FIG. 8 is a schematic flow chart diagram illustrating an embodiment of a method for extracting node parameters.
Figure 8:
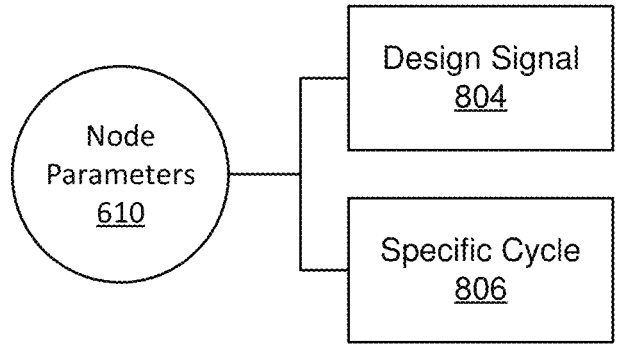

FIG. 8 is a schematic flow chart diagram illustrating an embodiment of a method 800 for extracting node parameters. The extraction module 302 extracts an extracted topology 802 from a proto file 604 and waveform information (e.g. a data path waveform 626). The extracted topology 802 includes netlist parameters 608. The split node module 304 analyses the extracted topology 802 to identify node parameters $610a$, $610b$ ... $610n$. The node parameters 610 include design signal information 804 and specific cycle information 806. The design signal information 804 includes node connection information, such as which inputs of a node connect to which outputs of another node. The specific cycle information 806 includes which clock cycle the node pertains.

Figure 10:
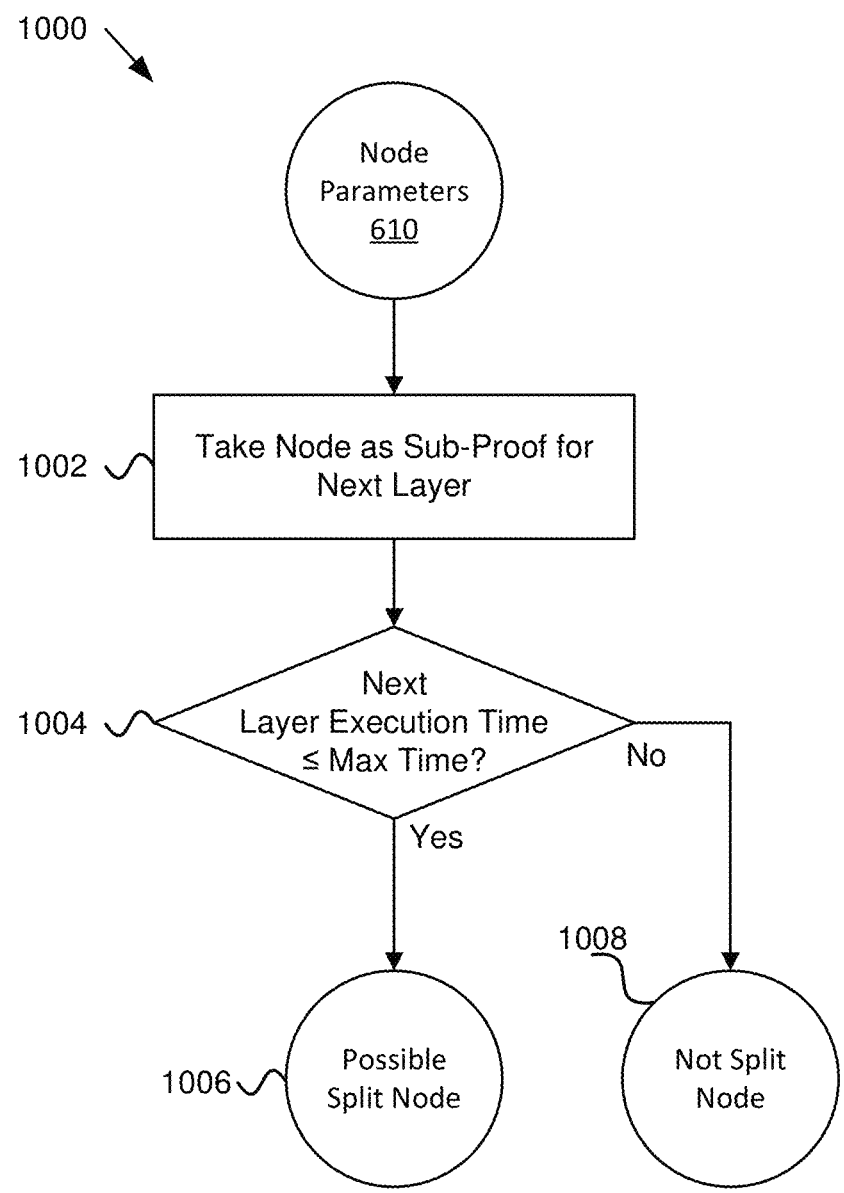
FIG. 10 is a schematic flow chart diagram illustrating another embodiment of a method for analyzing node parameters to determine if a node is a potential split node.

FIG. 10 is a schematic flow chart diagram illustrating another embodiment of a method 1000 for analyzing node parameters 610 to determine if a node is a potential split node. The split node module 304 analyzes 1002 a node using node parameters 610 taking analysis of a node as a sub-proof for a next layer. For a particular data flow diagram, if particular nodes are identified as potential split nodes or not split nodes in layer n, the split node module 304 uses connections from node parameters to determine if a node in a previous layer n−1 is a potential split node and determines 1004 predicted sub-proof execution time for the node in the n−1 layer has a predicted sub-proof execution time less than a sub-proof verification time limit. Note that a layer is associated with a particular clock execution cycle. In one example, if the sub-proof verification time limit is one hour and if a node in layer n−1 is connected to a potential split node and the predicted sub-proof execution time for the node is less than one hour then the node is a potential split node 1006. If the predicted sub-proof execution time is more than an hour or the node being evaluated is not connected to a potential split node in layer n, the node is not a split node 1008.

Figure 11A:
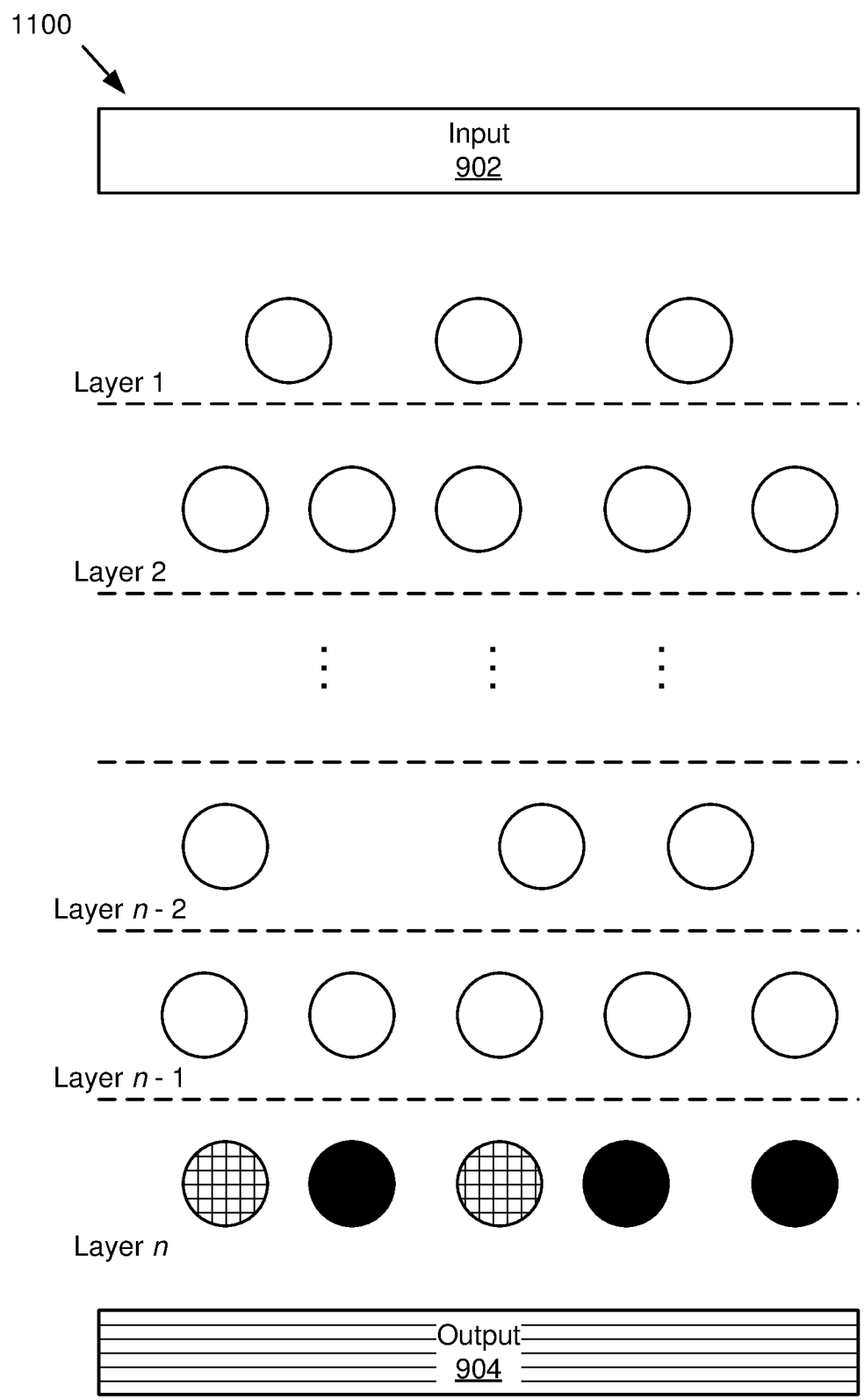
FIG. 11A is a schematic block diagram illustrating an example of data flow diagram and a first step in identifying potential split nodes and a split chain.
Figure 11B:
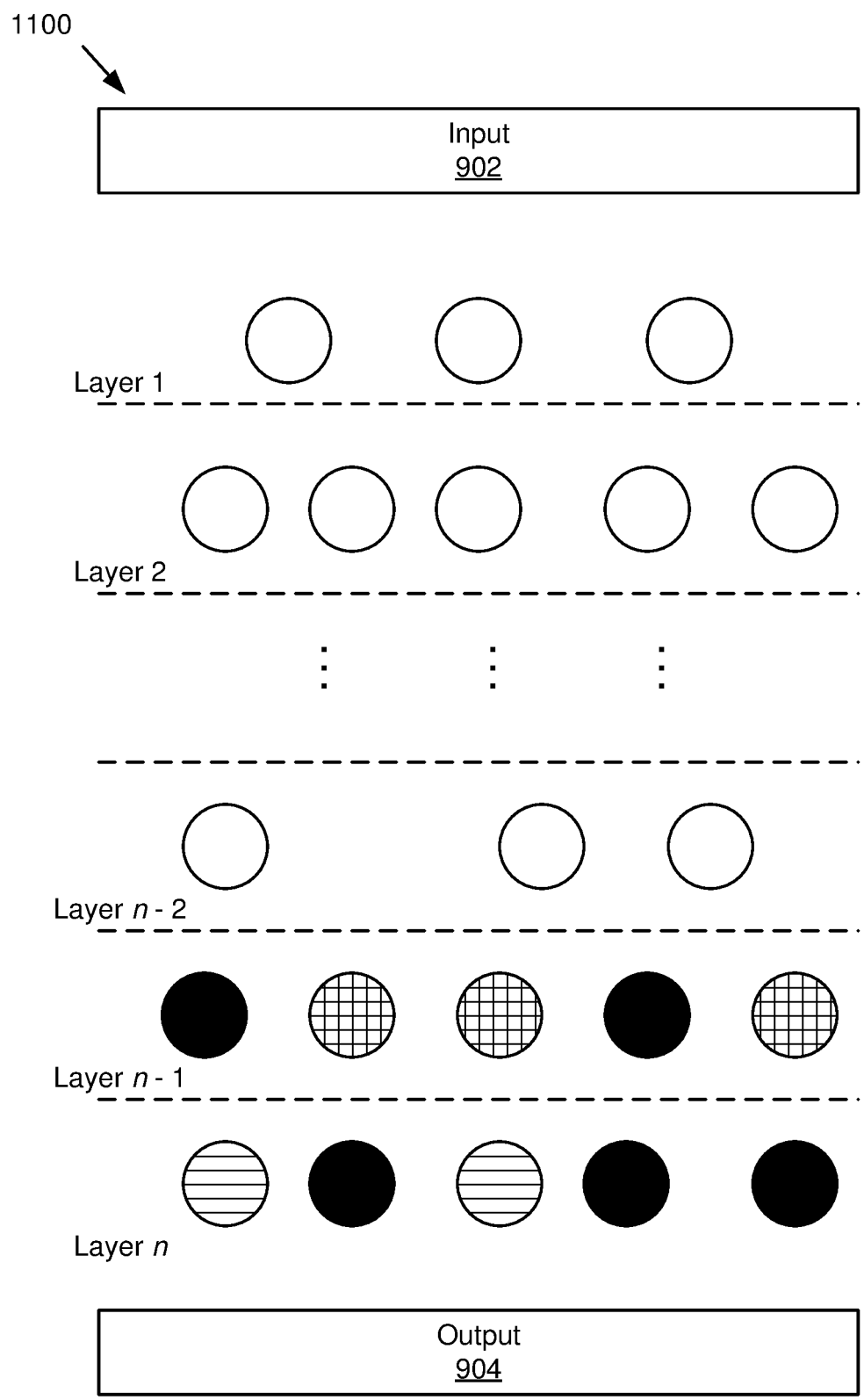
FIG. 11B is a schematic block diagram illustrating the example data flow diagram of FIG. 11A and a second step in identifying potential split nodes and a split chain.
Figure 11C:
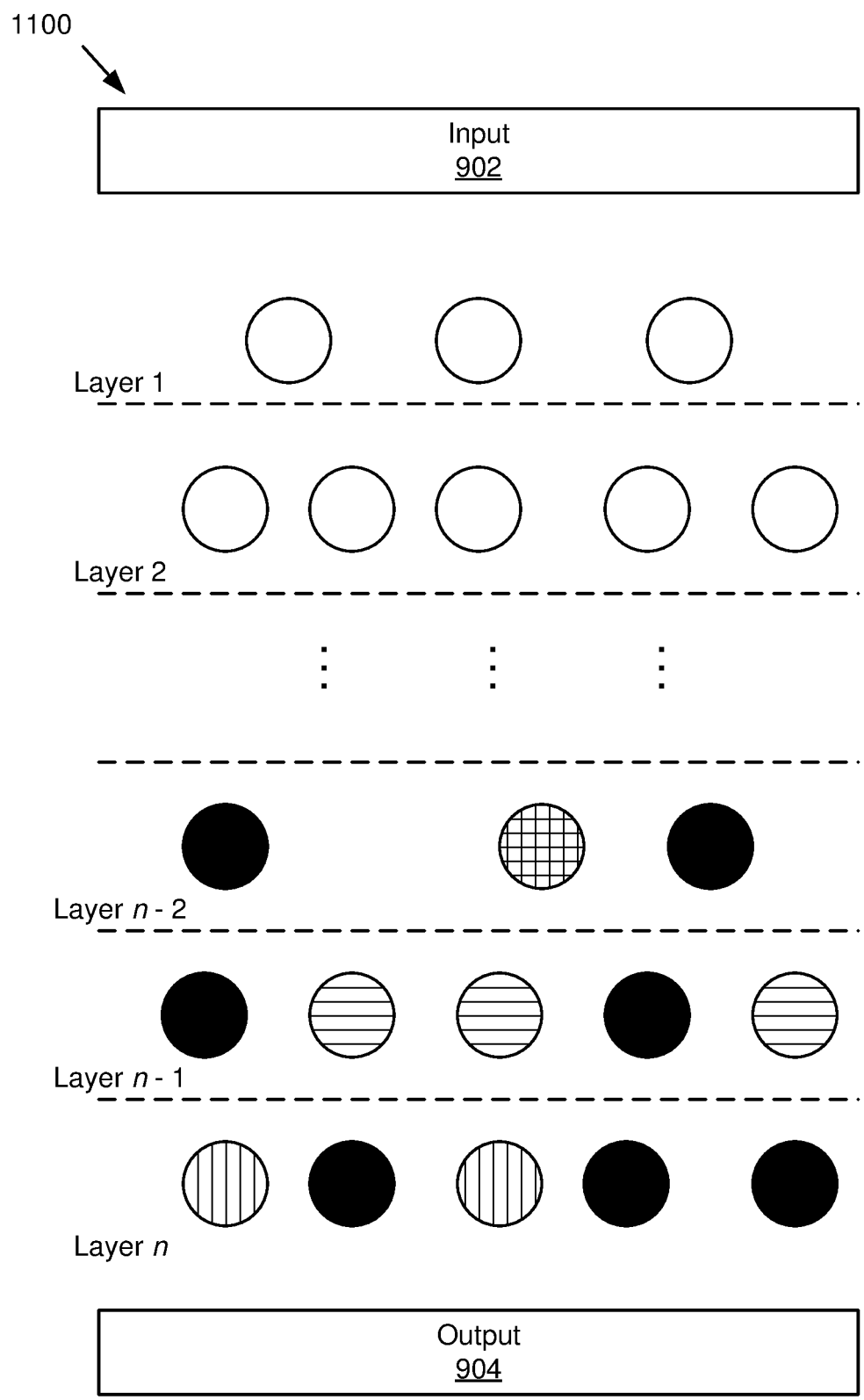
FIG. 11C is a schematic block diagram illustrating the example data flow diagram of FIG. 11A and a third step in identifying potential split nodes and a split chain.

FIG. 11A is a schematic block diagram illustrating an example of data flow diagram 1100 and a first step in identifying potential split nodes and a split chain. FIGS. 11B-11E are a second step, a third step, an n−1$^{th}$ step and an n$^{th}$ step in identifying potential split nodes and a split chain. In FIGS. 11A-11E, a node that is black is not a potential split node, nodes in a layer that have vertical and horizontal cross hatching have met a preliminary requirement connection to be a potential split node (or output 904) of a subsequent layer and are evaluated to determine if a projected sub-proof execution time is less than the sub-proof verification time limit. A node (or the output 904) with horizontal cross hatching in a layer indicates a node being used when evaluating a node in the previous layer. A node with vertical cross hatching indicates a node confirmed as a potential split node. A potential split node is a split node when a split chain from the input 902 to the output 904 is identified. Note that connection between nodes and between the nodes and the input 902 and the output 904 are not shown for clarity.

The first begins in FIG. 11A by evaluating the nodes in layer n using the output 904. Two nodes with vertical and horizontal cross hatching are identified as potential split nodes and three black nodes are not split nodes. The potential split nodes have a projected sub-proof execution time less than a sub-proof execution time limit and are connected to the output 904. The second step in FIG. 11B evaluates layer n−1 and three nodes with vertical and horizontal cross hatching are potential split nodes while two black nodes are not split nodes. The two nodes in layer n with horizontal cross hatching are used in evaluating the nodes in layer n−1. The potential split nodes in layer n−1 are connected to the potential split nodes of layer n and have a projected sub-proof execution time less than a sub-proof execution time limit. The third step in FIG. 11C evaluates layer n−2 and indicates that two black nodes are not split nodes and one node with vertical and horizontal cross hatching is a potential split node. The three nodes with horizontal cross hatching in layer n−1 are used in the evaluation while the two nodes with vertical cross hatching in layer n are confirmed potential split nodes.

Figure 11D:
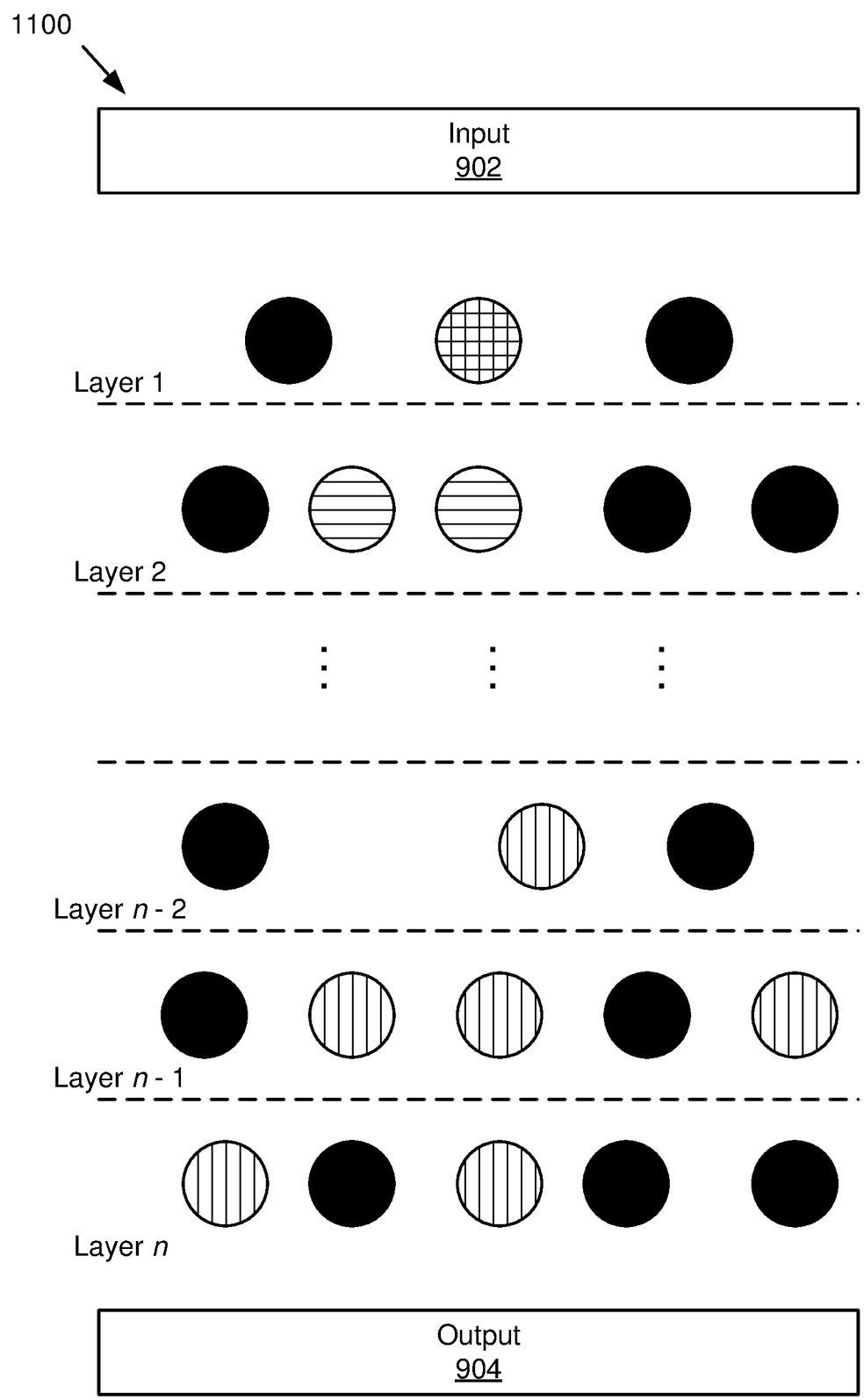
FIG. 11D is a schematic block diagram illustrating the example data flow diagram of FIG. 11A and an n−1$^{th}$ step in identifying potential split nodes and a split chain.
Figure 11E:
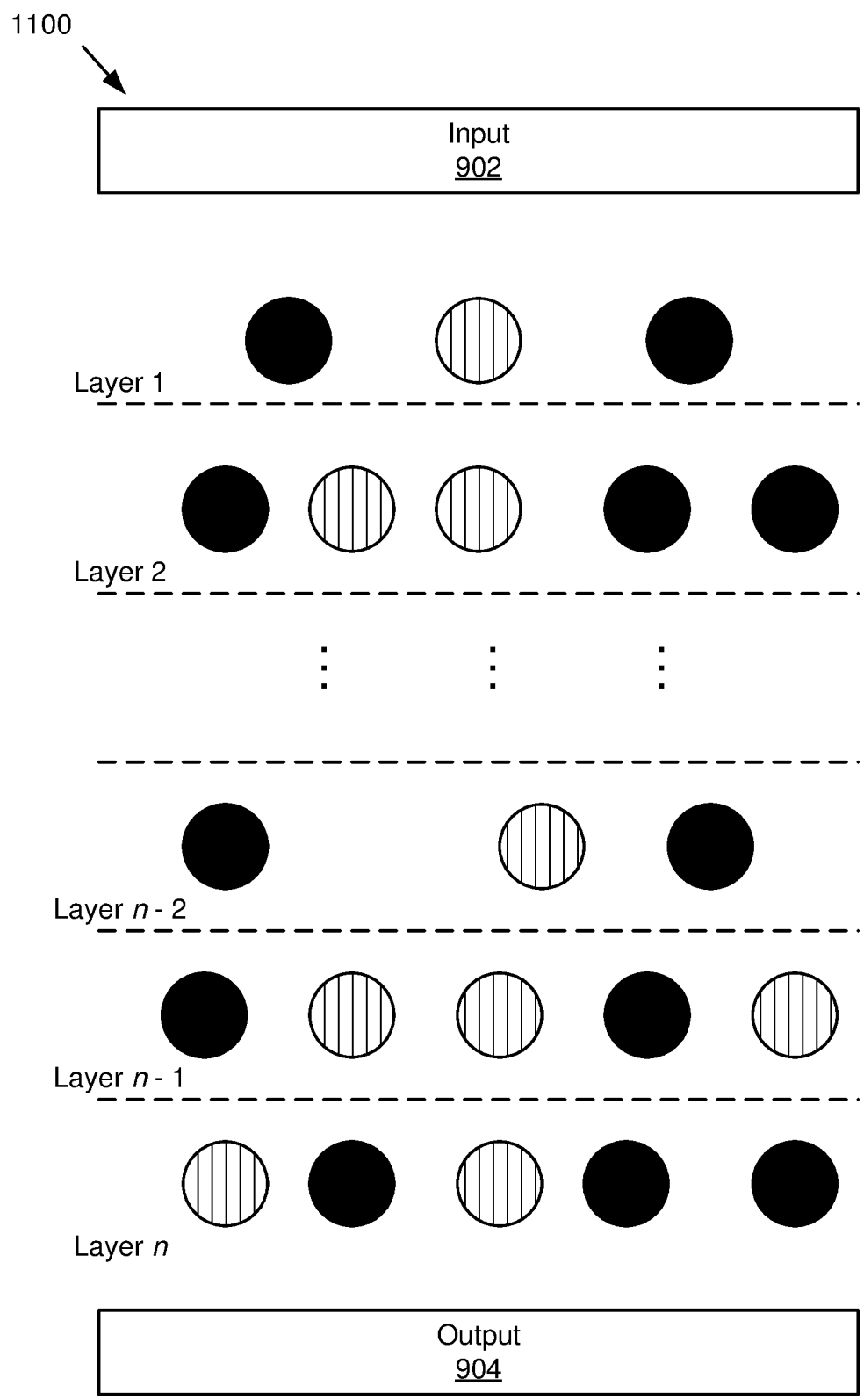
FIG. 11E is a schematic block diagram illustrating the example data flow diagram of FIG. 11A and an n$^{th}$ step in identifying potential split nodes and a split chain.

The process continues from the output 904 to the input 902 and the n−1$^{th}$ step in FIG. 11D where layer 1 includes one node with vertical and horizontal cross hatching that is a potential split node and is being evaluated while and there are two black nodes that are not split nodes. The two nodes with horizontal cross hatching in layer 2 are being used to evaluate the node in layer 1 and two nodes in layer 2 are not split nodes. There are nodes with vertical cross hatching in each depicted layer below layer 2 that are confirmed potential split nodes. The n$^{th}$ step is depicted in FIG. 11E and includes nodes with vertical cross hatching on each layer, which indicates that a split chain exists between the input 902 and the output 904. Note that there is a connection from the input 902 to the potential split node of layer 1. The split chain module 306 determines if there is a connection pathway from the input 902 through at least one potential split node in each layer and to the output 904. If the pathway exists, the split chain module 306 determines that there is a split chain. The sub-proof module 408 may be used to then evaluate the split nodes in the split chain by executing a verification engine for each split node. Where the execution for each split node indicates a sub-proof, the verification module 410 confirms verification of the integrated circuit design.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
    an extraction module that extracts netlist parameters from a static netlist, the netlist parameters comprising node parameters of each node of the static netlist, the node parameters comprising node connection information and execution cycle information, wherein the nodes of the static netlist comprising nodes of a portion of an integrated circuit design from an input to an output;
    a split node module that analyzes, using the netlist parameters, each node in a cycle and determines if each node is a potential split node, a potential split node comprising a node with a projected sub-proof execution time less than a sub-proof verification time limit;
    a split chain module that determines if a split chain exists between the input and the output, the split chain comprising a connection between potential split nodes from the input to the output at each execution cycle; and
    a reporting module that reports nodes of a split chain in response to the split chain module determining that a split chain exists,
    wherein at least a portion of said modules comprise one or more of hardware circuits, a programmable hardware device and executable code, the executable code stored on one or more computer readable storage media.

2. The apparatus of claim 1, further comprising a static netlist module that generates the static netlist from a proto file of the portion of the integrated circuit design.

3. The apparatus of claim 1, further comprising a data path waveform module that generates a data path waveform for the portion of the integrated circuit design, wherein the extraction module extracts the netlist parameters from the static netlist and the data path waveform.

4. The apparatus of claim 1, wherein the extraction module further comprises a data flow module that generates a data flow diagram from the netlist parameters, the data flow diagram comprising one or more of a determination of which nodes of the nodes of the static netlist are in each execution cycle and data connections between the nodes of the static netlist, wherein the split node module determines if a node is a potential split node using the data flow diagram.

5. The apparatus of claim 1, wherein each potential split node in a split chain comprises a split node and further comprising:
    a sub-proof module that runs a formal verification engine on each split node of a split chain; and
    a verification module that determines that the portion of the integrated circuit design is verified in response to the sub-proof module obtaining a sub-proof for each split node in a split chain pathway between the input and the output.

6. The apparatus of claim 1, wherein the split node module determines if a node in an execution cycle is a potential split node by using information from one of nodes in a subsequent execution cycle and the output to determine if the projected sub-proof execution time less than the sub-proof verification time limit.

7. The apparatus of claim 1, wherein the sub-proof verification time limit is within a range from 15 minutes to 4 hours.

8. The apparatus of claim 1, wherein the split node module uses a machine learning inference algorithm to determine if a node is a potential split node.

9. The apparatus of claim 8, wherein the machine learning inference algorithm uses normalized execution history information for a plurality of formal verification engines to determine if a node is a potential split node.

10. The apparatus of claim 1, wherein the netlist parameters further comprise design parameters and target parameters, the design parameters comprising one or more of a quantification of a scale of the integrated circuit design and design specific information, the target parameters comprising one or more of a determination of whether a reference design represents a portion of the integrated circuit design, a quantification of a scale of a reduced design, the reduced design comprising a modified netlist derived from the netlist of the integrated circuit design using a reduction engine of transformation-based verification.

11. The apparatus of claim 1, further comprising a stage module that identifies the portion of the integrated circuit design that is the source for the static netlist, wherein the stage module identifies the portion of the integrated circuit design by identifying a portion of the integrated circuit design that is relatively difficult to obtain a verification for the portion of the integrated circuit design using formal verification.

12. A computer-implemented method comprising:
   extracting netlist parameters from a static netlist, the netlist parameters comprising node parameters of each node of the static netlist, the node parameters comprising node connection information and execution cycle information, wherein the nodes of the static netlist comprising nodes of a portion of an integrated circuit design from an input to an output;
   analyzing, using the netlist parameters, each node in a cycle and determining if each node is a potential split node, a potential split node comprising a node with a projected sub-proof execution time less than a sub-proof verification time limit;
   determining if a split chain exists between the input and the output, the split chain comprising a connection between potential split nodes from the input to the output at each execution cycle; and
   reporting nodes of a split chain in response to the split chain module determining that a split chain exists.

13. The computer-implemented method of claim 12, further comprising generating the static netlist from a proto file of the portion of the integrated circuit design.

14. The computer-implemented method of claim 12, further comprising generating a data path waveform for the portion of the integrated circuit design, wherein extracting the netlist parameters comprises extracting the netlist parameters from the static netlist and the data path waveform.

15. The computer-implemented method of claim 12, further comprising generating a data flow diagram from the netlist parameters, the data flow diagram comprising one or more of a determination of which nodes of the nodes of the static netlist are in each execution cycle and data connections between the nodes of the static netlist, wherein determining if a node is a potential split node comprises determining if a node is a potential split node using the data flow diagram.

16. The computer-implemented method of claim 12, wherein each potential split node in a split chain comprises a split node and further comprising:
   running a formal verification engine on each split node of a split chain; and
   determining that the portion of the integrated circuit design is verified in response to obtaining a sub-proof for each split node in a split chain pathway between the input and the output.

17. The computer-implemented method of claim 12, wherein determining if a node in an execution cycle is a potential split node comprises using information from one of nodes in a subsequent execution cycle and the output to determine if the projected sub-proof execution time less than the sub-proof verification time limit.

18. A computer program product for formal verification, the computer program product comprising a computer readable storage medium having program instructions embodied therewith, the program instructions executable by a processor to cause the processor to:
   extract netlist parameters from a static netlist, the netlist parameters comprising node parameters of each node of the static netlist, the node parameters comprising node connection information and execution cycle information, wherein the nodes of the static netlist comprising nodes of a portion of an integrated circuit design from an input to an output;
   analyze, using the netlist parameters, each node in a cycle and determine if each node is a potential split node, a potential split node comprising a node with a projected sub-proof execution time less than a sub-proof verification time limit;
   determine if a split chain exists between the input and the output, the split chain comprising a connection between potential split nodes from the input to the output at each execution cycle; and
   report nodes of a split chain in response to the split chain module determining that a split chain exists.

19. The computer program product of claim 18, the program instructions further causing the processor to one or more of:
   generate the static netlist from a proto file of the portion of the integrated circuit design;
   generate a data path waveform for the portion of the integrated circuit design, wherein extracting the netlist parameters comprises extracting the netlist parameters from the static netlist and the data path waveform;
   generate a data flow diagram from the netlist parameters, the data flow diagram comprising one or more of a determination of which nodes of the nodes of the static netlist are in each execution cycle and data connections between the nodes of the static netlist, wherein determining if a node is a potential split node comprises determining if a node is a potential split node using the data flow diagram; and
   determine if a node in an execution cycle is a potential split node comprises using information from one of nodes in a subsequent execution cycle and the output to determine if the projected sub-proof execution time less than the sub-proof verification time limit.

20. The computer program product of claim 18, wherein each potential split node in a split chain comprises a split node and the program instructions further causing the processor to:
   run a formal verification engine on each split node of a split chain; and
   determine that the portion of the integrated circuit design is verified in response to obtaining a sub-proof for each split node in a split chain pathway between the input and the output.

* * * * *